United States Patent [19]

Bescup et al.

[11] Patent Number: 4,837,069
[45] Date of Patent: Jun. 6, 1989

[54] TRANSPARENT ALUMINA MICROSPHERES

[75] Inventors: Terrance L. Bescup, Woodbury; Benjamin T. Fellows, Oakdale, both of Minn.; Charles J. Leedecke, Northford, Conn.

[73] Assignee: Minnesota Mining and Manufacturing Company, St. Paul, Minn.

[21] Appl. No.: 1,173

[22] Filed: Jan. 7, 1987

[51] Int. Cl.$^4$ .......................... C01F 7/02; F21D 7/22; B32B 9/03

[52] U.S. Cl. .................................. 428/148; 106/442; 106/401; 350/105; 404/14; 423/600; 423/625; 423/628; 428/141; 428/329; 428/402; 428/457; 501/127; 523/172

[58] Field of Search .......................... 264/15; 501/127; 423/625, 628, 600; 350/105; 404/14; 428/329, 402, 402.24, 141, 148, 457; 252/315.7, 589; 106/288 B; 523/172

[56] References Cited

U.S. PATENT DOCUMENTS

| | | | |
|---|---|---|---|
| 2,326,634 | 8/1943 | Gebhard et al. | 88/82 |
| 2,354,018 | 7/1944 | Heltzer et al. | 88/82 |
| 2,407,680 | 9/1946 | Palmquist et al. | 88/82 |
| 2,631,353 | 3/1953 | Robinson | 428/402 |
| 2,963,378 | 12/1960 | Palmquist et al. | 106/193 |
| 3,026,177 | 3/1962 | St. Pierre et al. | 23/142 |
| 3,026,210 | 3/1962 | Coble | 106/39 |
| 3,625,773 | 12/1971 | Charles et al. | 136/153 |
| 3,849,351 | 11/1974 | Jorgensen | 260/18 N |
| 3,905,845 | 9/1975 | Kobayashi et al. | 501/119 |
| 3,944,658 | 3/1976 | Yoldas | 423/626 |
| 4,025,159 | 5/1977 | McGrath | 350/105 |
| 4,031,177 | 6/1977 | Auriol et al. | 264/65 |
| 4,071,594 | 1/1978 | Pearson et al. | 501/103 |
| 4,117,192 | 9/1978 | Jorgensen | 428/337 |
| 4,125,407 | 11/1978 | Ueno | 501/127 |
| 4,150,317 | 4/1979 | Laska et al. | 423/625 |
| 4,166,147 | 8/1979 | Lange et al. | 501/126 |
| 4,222,978 | 9/1980 | Oda et al. | 423/625 |
| 4,248,932 | 2/1981 | Tung et al. | 428/325 |
| 4,285,732 | 8/1981 | Charles et al. | 106/57 |
| 4,309,312 | 1/1982 | Takumi et al. | 423/628 |
| 4,314,827 | 2/1982 | Leitheiser et al. | 51/298 |
| 4,318,896 | 3/1982 | Schoonover | 423/628 |
| 4,349,456 | 9/1982 | Sowman | 252/317 |
| 4,357,427 | 11/1982 | Ho et al. | 501/153 |
| 4,367,919 | 1/1983 | Tung et al. | 350/105 |
| 4,490,432 | 12/1984 | Jordan | 428/220 |
| 4,542,113 | 9/1985 | Meyer et al. | 502/8 |
| 4,543,346 | 9/1985 | Matsui et al. | 501/153 |
| 4,564,556 | 1/1986 | Lange | 428/325 |
| 4,574,003 | 3/1986 | Gerk | 501/153 |

FOREIGN PATENT DOCUMENTS

| | | |
|---|---|---|
| 0224375 | 6/1987 | European Pat. Off. . |
| 0232980 | 8/1987 | European Pat. Off. . |
| 2742709 | 9/1978 | Fed. Rep. of Germany ...... 423/628 |
| 2921336 | 12/1979 | Fed. Rep. of Germany ...... 428/402 |
| 1264914 | 7/1969 | United Kingdom ................ 423/625 |

OTHER PUBLICATIONS

Bates, C. H., et al., "A Simplified Process for Preparing Translucent Alumina Tubes From Boehmite Powder", Trans. J. Brit. Ceram. Soc., 70(4), pp. 128–130, 1971.

Primary Examiner—George F. Lesmes
Assistant Examiner—James B. Monroe
Attorney, Agent, or Firm—Donald M. Sell; Walter N. Kirn; Douglas B. Little

[57] ABSTRACT

Procedure for making $Al_2O_3$ spheroids, 600 micrometers in diameter or less, utilizes an AlOOH sol containing 0.25% weight percent MgO (in the form of $Mg(NO_3)_2 \cdot 6H_2O$) and $HNO_3$. The sol is dispersed into droplets in a particle forming fluid (e.g., 2-ethylhexanol) where gelling occurs. The gelled spheroids are collected, dried and pre-fired in air at temperatures less than 1,200° C. for up to about 12 hours. The dried and prefired beads are fired in a 2-step process at temperatures of about 1,850–1,950° C. in the following sequence:
a first dry oxygen firing for about ten minutes, followed by a wet hydrogen firing for up to 350 minutes. Reasonably transparent microspheres having crystallites in the range of 5–100 micrometers are obtained with little intergranular porosity, and their density is estimated to be near theoretical.

10 Claims, 1 Drawing Sheet

U.S. Patent    Jun. 6, 1989    4,837,069
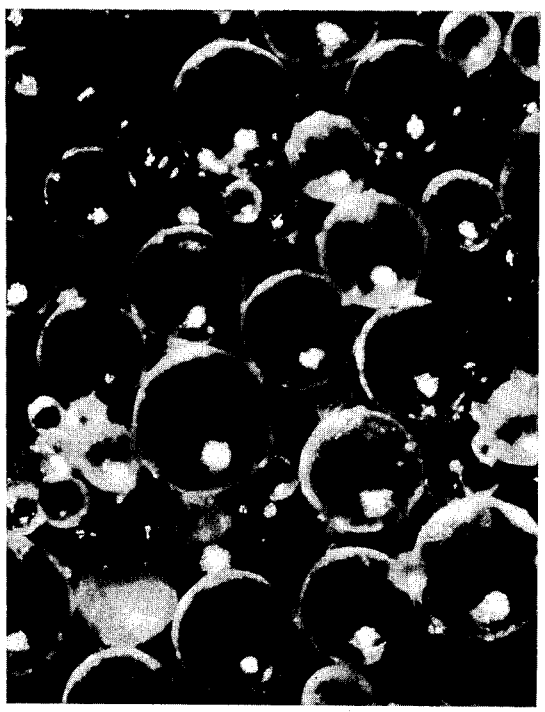

TRANSPARENT ALUMINA MICROSPHERES

TECHNICAL FIELD

This invention relates to alumina microspheres, generally less than 0.5 millimeters in diameter. It also relates to the field of pavement markings which include transparent microspheres for reflectorizing the markings.

BACKGROUND

The pavement marking industry has long desired transparent, solid microspheres or beads that would be useful as brighter and/or more durable retroreflective lens elements in pavement markings. The transparent microspheres now most widely used for pavement markings are made of certain glasses, which are amorphous vitreous materials. Generally these glasses are of the soda-lime-silicate type having a refractive index of only about 1.5, which limits their retroreflective brightness. Glass microspheres can be scratched or chipped by grit and dirt particles on the highway.

Transparent microspheres are taught in U.S. Pat. No. 4,564,556. These microspheres are ceramic microspheres made by sol-gel processes from raw materials such as silica and zirconium compounds.

In order to function in pavement markings, such microspheres need to be resistant to scratching, chipping, cracking, and fracture under the conditions to which they are subjected on the road.

DISCLOSURE OF INVENTION

This invention provides transparent, solid ceramic spheroids, beads or microspheres which can be made with sufficient clarity, index of refraction, and other properties to make them useful as lens elements in retroreflective pavement markings. These new particles may be summarized as:

solid, polycrystalline spheroids useful as lens elements in retroreflective pavement markings having a diameter less than about 600 micrometers, comprising aluminum oxide having crystallites of about 5 to 200 micrometers in largest dimension, preferably 5 to 100 micrometers.

The term solid means a body which is not hollow, i.e. lacking any substantial cavities within the microspheres such as described in U.S. Pat. No. 4,349,456 directed to ceramic metal oxide microcapsules.

The invention spheroids are, for the most part, transparent. The term transparent, for purposes of this discussion means that the spheroids when viewed under an optical microscope (e.g., at 100×) have the property of transmitting rays of visible light so that bodies beneath the spheroids, such as bodies of the same nature as the spheroids, can be seen through the spheroids, when both are immersed in oil of approximately the same refractive index as the spheroids. Although the oil should have a refractive index approximating that of the spheroids, it should not be so close that the spheroids seem to disappear (as they would in the case of a perfect index match). The outline, periphery or edges of bodies beneath the spheroids are discernible.

The inventive spheroids can be made fully dense. The term fully dense means close to theoretical density and having substantially no open porosity detectable by standard analytical techniques such as the B.E.T. nitrogen technique (based upon adsorption of $N_2$ molecules from a gas with which a specimen is contacted). Such measurements yield data on the surface area per unit weight of a sample (e.g. $m^2/g$) which can be compared to the surface area per unit weight for a mass of perfect microspheres of the same size to detect open porosity. Higher specific surface ($m^2/g$) indicates higher surface irregularities and/or porosity. Such measurements may be made on a Quantasorb apparatus made by Quantachrome Corporation of Syosset, N.Y. Density measurements may be made using an air or water pycnometer.

The spheroids described herein may be truly spherical but may also be oblate or prolate.

The ceramic spheroids of the invention can be made by sol-gel processes. Generally, a sol-gel process is one which converts a colloidal dispersion, sol, aquasol or hydrosol of a metal oxide (or precursor thereof) to a gel. A gel is a material form wherein one or more of the components are crosslinked either chemically or physically to such an extent as to cause a three dimensional network to form. The formation of this network results in an increase in the viscosity of the mixture and a mechanical immobilization of the liquid phase within the network. The gelling step is often followed by drying and then firing to obtain a ceramic material.

The transparent $Al_2O_3$ spheroids can be used as lens elements in durable pavement markings to impart retention of retroreflectivity, thereby providing improved roadway marking visibility to the nighttime motorist.

The pavement markings of this invention include sheet materials for application to road surfaces and also lane marking lines in which the spheroids are dropped onto wet paint or hot thermoplastic (see U.S. Pat. No. 3,849,351) which serves as the binder adhering to the spheroids. Coating compositions comprising the transparent ceramic spheroids described herein mixed with binder materials, such as paint, are also included within the scope of this invention.

The ceramic spheroids of this invention are useful not only in pavement marking materials but also in other fields such as: peening materials (because of their toughness); high temperature ball bearings, fillers and reinforcing agents in such materials as glass, refractory materials, ceramics, metal matrix materials and polymers.

BRIEF DESCRIPTION OF THE FIGURE

The FIGURE is a photomicrograph taken at 60× magnification, of the alumina spheroids of this invention.

DETAILED DESCRIPTION

The spheroids made according to this invention have comprised alpha (α) alumina, the theoretical density of which is about 3.97 g/cc. The spheroids of this invention have a unique combination of hardness, strength and toughness. They are quite resistant to wear by sand on roadways, and yet their reflective power is approximately equal to typical glass beads having an index of refraction ($N_D$) of 1.5. Voids in the spheroids are minimized by firing the gelled spheroid precursors to a dense state, improving transparency and avoiding the weakening effect that structural gaps can cause.

Alumina for making the inventive spheroids can be furnished in the form of aqueous sols or solutions of oxide precursors that are stable in a normal ambient environment, e.g., 23° C. and 50% relative humidity. For example, aluminum isopropoxide or aluminum monohydrate (AlO(OH) in Boehmite form) may be dispersed at up to 18 wt.% solids in water with a small amount of nitric acid ($HNO_3$). Preferably, the colloid particle size in the sol is not more than 60 nanometers (nm), and the proportion of agglomerated particles is low. This dispersion may be heated at about 70°–80° C. for 15 to 24 hours to achieve peptization. About 0.05–0.5 weight percent (preferably 0.25%) MgO (in the form of $Mg(NO_3)_2 \cdot 6H_2O$) is also included in the dispersion. Other additives such as $MgF_2$, $TiO_2$, $La_2O_3$ or $Y_2O_3$ may be present instead of or in addition to MgO.

The resulting sol is stable for up to six days during which it is fed to a forming fluid (such as 2-ethylhexanol) by means which forms droplets in the forming fluid. Such means include adding the sol as droplets by pumping them through a nozzle or adding the sol as a liquid stream to the forming fluid and shearing the combination of the two by agitation to produce droplets just prior to gelation of the sol. The size of the spheroids can be controlled by the type of nozzle used or by the degree of agitation in an agitated forming fluid. If the droplets are uniform in size, they will have a diameter about twice as big as the nozzle inside diameter.

There is no universal forming fluid for gelation, but most are substantially water immiscible. Some usable particle forming fluids are: 2-ethylhexanol, n-butanol and a mixture of 2-ethylhexanol and isopropanol. The appropriate forming fluid for any particular sol-gel system is found by experimentation. Generally, the volume of sol is about 1 to 10 percent of the volume of forming fluid. The agitated forming fluid serves to disperse and spheroidize the sol droplets. After 5–15 minutes residence time in the forming fluid is needed to gel the spheroids.

The gelled beads are removed from the forming fluid (e.g. by filtration) dried in an oven (for example at 150°–180° C.) to remove residual water and forming fluid, and prefired by increasing their temperature slowly (e.g. over 4 to 8 hours) to 800° to 1200° C. The pre-fired $Al_2O_3$ beads are then fired first in dry oxygen at 1850°–1975° C. for 5 to 30 minutes (preferably 5–15 min.), and then separately fired in wet hydrogen at 1800°–1975° C. for about 10 to 350 minutes. The firing sequence of using two separate firing steps in different atmospheres has been instrumental in obtaining an unusually high degree of transparency in alumina. The samples can be raised from prefiring to firing temperature either slowly (over several hours) or rapidly (in 3 to 5 minutes). It is important to avoid exposure of the $Al_2O_3$ beads to nitrogen, argon or helium gas at high temperatures (i.e. greater than or equal 1500° C.) prior to either the firing in oxygen or hydrogen. The sequential firing in oxygen and then hydrogen yield spheroids which are distinctly more clear and defect free than can be obtained from either oxygen or hydrogen firing alone.

In the firing process, there may be a relationship between firing temperature and time. That is, less time may be required for complete firing at higher temperatures in order to obtain transparency. Also, the larger sizes of spheroids may require either higher prefiring temperature or a longer prefiring time. For example, prefiring at 900° C. for 15 hours yields good results for spheroids greater than 300 micrometers in diameter.

The apparatus used for firing the spheroids in the research and development which lead to this invention was a horizontal graphite element resistance furnace made by Astro Industries, Inc. of Santa Barbara, Calif. The furnace was fitted with a removable alumina muffle tube with threaded and sealed ends, to facilitate changing the atmosphere and the introduction and removal of samples. The two ends of the furnace were fitted with graphite end plugs having holes bored therein through which the alumina muffle tube was passed in order to fix it in position. End caps were fitted to each end of the muffle tube, and suitable connections were installed at the end caps to allow the introduction of various gases into the muffle tube during firing.

In order to meet the criteria stated above for avoiding exposure to $N_2$, Ar and He at high temperatures, the alumina spheroids would be removed from the furnace after the oxygen firing step. Then, the furnace muffle tube would be purged with nitrogen followed by a wet hydrogen purge. The spheroids would be placed back inside the furnace for completion of the firing.

Some firing conditions which have been used successfully in the development of this invention are: first firing the spheroids in dry oxygen for 10 minutes at 1850°–1900° C. followed by wet hydrogen firing in the same temperature range for 300–340 minutes. This firing sequence has resulted in approximately 100% yield of transparent spheroids having smooth surfaces.

The invention will be further clarified by consideration of the following examples which are intended to be purely exemplary.

EXAMPLE I 0.6685 g of $Mg(NO_3)_2 \cdot 6H_2O$ was dissolved in 450 ml of hot water (82° C.).

153.14 g aluminum isopropoxide was added to the above solution while stirring vigorously with a high shear mixer (Shar mixer) at high speed. A viscous slurry containing no visible lumps was obtained. 6.075 g of 70% $HNO_3$ was added and mixing continued for about 12 minutes.

The above slurry was poured into a 2000 ml stainless steel pressure vessel (Parr Reactor Model 4522) which was heated to about 85° C., and the slurry was agitated. The reactor vent valve was open and isopropanol vapors were removed and condensed in a water cooled condenser and collected. When the isopropanol flow ceased, the reactor agitator was stopped and the vessel was opened. The contents were poured into a glass jar, and the jar lid was tightly sealed.

The resulting sol was aged in the jar for about 48 hours in a circulating air oven at about 93° C. The sol was characterized as follows: viscosity of 180 cps (Brookfield RVT, No. 3 spindle at 50 rpm); 64% light transmission (measured in Bausch & Lomb Spectronics 20 Spectrometer at 400 nm. wavelength); $Al_2O_3$ and MgO comprised 10.46 wt.%; and the colloid particle size had a bimodal distribution with peaks at 28–38 nm and 77–108 nm, the smaller peak representing about 88% by weight of the colloidal particles present.

A forming fluid was made comprising 1200 ml 2-ethenylhexanol and 300 ml isopropanol plus 5 ml sorbitan monooleate (obtained as Span 80 from ICI America, Inc.). The forming fluid was placed in a 2000 ml glass beaker and was slowly stirred. The $Al_2O_3$ sol described above was added to the forming fluid dropwise from a syringe pump at about 0.5 ml per minute through an 18 gauge hypodermic needle the end of which had been cut to remove any bevel and sanded smooth. The sol droplets were stirred for about 15 minutes in the forming fluid using just enough agitation to prevent settling of the droplets.

The resulting gelled particles were separated from the forming fluid by decantation, and the particles were then washed in fresh isopropanol. This step has been found useful in reducing formation of bubbles in the product during drying. The resulting gelled spheroids were separated from the isopropanol by decantation and dried in an oven at about 93° C. for about 1 hour.

The dried particles were then prefired in small quantities of about 25 g each in a crucible in an air atmosphere as follows: temperature raised from 25° C. to 400° C. over 2 hours; temperature maintained at 400° C. for one hour; temperature raised to 900° C. over a 4 hour period and maintained at 900° C. overnight. The spheroids were then removed from the furnace and allowed to cool by themselves.

The prefired spheroids were fired in a horizontal graphite tube furnace as follows:

(a) the muffle tube was purged with $O_2$;

(b) a smaller diameter sample tube containing about 4 ml of prefired spheroids was inserted slowly (i.e., over a 2 minute period) into the hot zone of the tube furnace inside the muffle tube which was maintained at 1940° C. Temperature in the hot zone was measured by sighting on a small $Al_2O_3$ chip within the muffle tube with an optical pyrometer. The spheroids remained in the muffle tube at that temperature for 30 minutes, after which they were withdrawn;

(c) the muffle tube was purged with $N_2$, and then the gas for the muffle tube was switched to $H_2$ bubbled through water. The $H_2$ gas discharging from the muffle tube was lit and allowed to burn as a safety precaution. The spheroid sample was then reinserted into the muffle tube hot zone and fired at 1940° C. for 30 minutes and then removed.

The resulting fired spheroids were examined under a 60 power microscope and found to be transparent. They had smooth surfaces with inconspicuous grain boundaries, and the larger spheroids (e.g. 375 micrometers diameter) and the smaller spheroids (e.g. 100 micrometers) were similar in appearance.

These spheroids were screened between 40 mesh (425 micrometer) and 120 mesh (125 micrometers) screens and then coated densely onto a tape made with $TiO_2$ pigment adhesive to simulate a diffuse retroreflective pavement marking device. Observation of this device with a flashlight held near the eye in a darkened room showed that the retroreflective power of the $Al_2O_3$ spheroids was similar to that of $1.5N_D$ glass beads mounted in a similar fashion. $1.5N_D$ glass beads are commonly used for highway markings.

EXAMPLE II

In using dispersible alumina to form a sol the following ingredients may be used:

487.8 g AlO(OH) (about 81% $Al_2O_3$ content, obtained from Chattem Chemicals Co.)
1800 ml deionized water (70°-80° C.)
6.3075 g $Mg(NO_3)_2 \cdot 6H_2O$
20.9263 g 70% $HNO_3$ The magnesium nitrate would be dissolved in the water, and the AlO(OH) powder would be added with vigorous stirring. The $HNO_3$ would then be added and stirring continued for several minutes. The resulting slurry would be heated to 70°-80° C. and maintained at that temperature for 15-24 hours during which gentle agitation is preferred, but not necessary. The resulting sol would be added dropwise to stirred 2-ethylhexanol forming fluid in which the droplets would be maintained for 5-15 minutes for gelling. About 0.3 wt.% sorbitan monooleate would be added to the forming fluid to reduce droplet coalescence. The resulting gelled spheroids would be dried (e.g. at 175° C.) to remove residual water and 2-ethylhexanol, and then slowly prefired over 4-8 hours to 900° C. The spheroids would then be fired in dry $O_2$ for 5-15 minutes and then in wet $H_2$ for 15-300 minutes at 1850°-1950° C. At this point, the $Al_2O_3$ spheroids would be in the alpha crystal phase.

INDUSTRIAL APPLICABILITY

The transparent $Al_2O_3$ spheroids of this invention are useful in pavement marking sheet materials (i.e. sheeting to be applied to road surfaces). The spheroids of this invention can also be incorporated into coating compositions which generally comprise a film-forming material in which a multiplicity of the spheroids are dispersed (e.g. see Palmquist U.S. Pat. No. 2,963,378).

There are several types of retroreflective sheeting in which the inventive spheroids may be used, such as exposed lens (as taught for examples in U.S. Pat. Nos. 2,326,634 and 2,354,018), embedded lens (see for example U.S. Pat. No. 2,407,680) and encapsulated lens (see U.S. Pat. No. 4,025,159) sheeting. These sheeting types and methods for manufacturing them are known to the art. The drawings of the aforementioned patents (U.S. Pat. Nos. 4,025,159; 2,407,680; and 2,326,634) illustrate the various sheeting types and are incorporated by reference herein.

Pavement marking sheet material may be described as a prefabricated strip adapted to be laid on and secured to pavement for such purposes as lane dividing lines and comprises:

1. A base sheet, made of a material such as a soft aluminum foil or elastomer precursors, which is conformable to a roadway surface;

2. A top layer (also called the support film or binder film) adhered to one surface of the base sheet and being very flexible and resistant to rupture (e.g. vinyl polymers, polyurethanes, epoxides, or polyesters); and 3. A monolayer of transparent spheroid lens elements partially embedded in the binder layer.

The pavement marking sheet construction may include an adhesive (e.g., pressure sensitive, heat or solvent activated, or contact adhesive) on the bottom of the base sheet.

Such pavement marking sheets are further described in U.S. Pat. Nos. 4,117,192; 4,248,932; and 4,490,432, the disclosure of which are incorporated by reference herein. Useful materials disclosed in these patents for polymeric base sheets are acrylonitrile-butadiene polymers, millable polyurethanes, and neoprene rubber. Polymeric base sheets are generally at least ⅜ mm thick but less than 2 or 3 mm thick. Particulate fillers, such as silica, glass or ceramic microspheres, and skid resisting particles, may also be included in the polymeric base sheet.

Pavement marking sheets may be made by processes known in the art (see e.g. U.S. Pat. No. 4,248,932), one example comprising the steps of: (i) coating onto a base sheet of soft aluminum (typically less than 100 micrometers thick) a mixture of resin (e.g., epoxy and acrylonitrile butadiene elastomer mixture), pigment ($TiO_2$) and solvent (e.g., methylethylketone) to form the support film; (ii) dropping onto the wet surface of the support film ingredients a multiplicity of the transparent spheroids and (iii) curing the support film at 150° C. for about 10 minutes. A layer of adhesive (typically 50-150 micrometers thick) is then usually coated onto the bottom of the base sheet.

Pigments or other coloring agents may be included in the binder layer in an amount sufficient to color the sheet material for use as a traffic control marking. Titanium dioxide will typically be used for obtaining a white color.

Pavement marking sheet materials of this invention have been tested in a sand blast test. This test utilizes an apparatus comprised of a channel about 156 mm wide and 508 mm long in which is mounted a flat metal (e.g. aluminum) plate about 152 mm wide. The pavement marking sheet material sample being tested is adhered to the metal plate which is moved down the channel by engagement with an electric motor having a speed control. A commercial compressed air sand blast gun having a compressed air supply at for example 10 psig. (69 kPa) and using common sand blast sand (e.g., 70% 250/425 micrometer particle size) is directed toward a portion of the channel which must be passed by the sample. The sand blast gun is placed with its tip at a fixed distance (e.g. 762 mm) from the point where sand will impact the sample, and it is oriented at a fixed angle (e.g. about 75°) to the channel such that the sample is moving toward the point where sand is impacting at a rate of about 0.04 mm/sec (1½ in/sec.)

The sample passes the point of the impacting sand repeatedly, and retroreflectivity of the sample is measured after a number of passes to test the durability of the lense elements. Brightness or specific luminance is measured in units of millicandela/square foot/foot candle (mcd/ft$^2$/fc) with a photometer. Measurements have been made with incident light at an angle of 4° from normal to the surface of a reflective sheet in which the spheroids have been incorporated, with a divergence angle between the light source and the photocell of 0.2°. Refer to ASTM test D4061.

Crush strength of the spheroids has also been measured in a bead crushing machine, the major features of which are two parallel plates made of very hard, non-deforming material (e.g. sapphire or tungsten carbide). A single spheroid of known diameter is placed on the lower plate, and the upper plate is lowered until the spheroid fails. Crush strength is the force exerted on the spheroid at failure divided by the cross-sectional area of the spheroid ($\pi r^2$). Ten spheroids of a given composition are tested and the average result is reported as the crush strength. The crush strength of the inventive spheroids (containing 0.25 weight percent MgO and fired 10 minutes in $O_2$ at 1885° C. and 300 minutes in wet $H_2$ at 1885° C.) has been measured at 123,000 psi (847 MPa).

EXAMPLE III

Tests have been performed to evaluate the potential of the transparent $Al_2O_3$ spheroids in pavement marking applications. Test pieces of pavement marking tape were made by coating a white pigmented vinyl resin on aluminum foil and sprinkling spheroids or microspheres on the wet vinyl binder. After curing the binder, the resulting beaded retroreflective tape was subjected to the sandblast test. Several different types of beads were tested for comparison. The data below shows the relative retained retroreflective brightness of the various tapes.

TABLE 1

| Microsphere Type | Percent of Original Retroreflective Brightness Retained After 20 Passes Under Sandblast Gun | Crush Strength (MegaPascals) |
| --- | --- | --- |
| Inventive $Al_2O_3$ Spheroids of Example 1 | 100 | 423 |
| $ZrO_2$—$SiO_2$ Micro-Spheres of U.S. Pat. No. 4,564,556 | 79.2 | 1468 |
| 1.75 $N_D$ Glass Beads of U.S. Pat. No. 4,367,919 | 16.7 | 620 |
| 1.9$N_D$ Glass Beads | 4.7 | 267 |
| 1.5$N_D$ Glass Beads | 57.4 | 546 |

The above data show that the inventive $Al_2O_3$ spheroids have a remarkable resistance to abrasion, allowing them to retain their brightness in a pavement marking construction. The actual retroreflective brightness has been measured at about 1.5 to 2 mcd/ft$^2$/fc, and the inventive spheroids generally have a brightness in such pavement marking constructions (as described in the above test) of greater than 1 mcd/ft$^2$/fc.

Other embodiments of this invention will be apparent to those skilled in the art from a consideration of this specification or the practice of the invention disclosed herein. Various omissions, modifications, and alterations of this invention may be made without departing from the true scope and spirit of this invention which is indicated by the following claims.

What is claimed is:

1. A solid, transparent, polycrystalline spheroid useful as a retroreflective lens element and having a diameter less than about 500 micrometers, consisting essentially of alpha alumina having crystallites of about 5 to 200 micrometers in largest dimension.

2. The solid, polycrystalline $Al_2O_3$ spheroid of claim 1 wherein the crystallites are about 10 to 100 micrometers in largest dimension.

3. The $Al_2O_3$ spheroid of claim 1 which is fully dense.

4. The $Al_2O_3$ spheroid of claim 1 which, when incorporated into test pieces comprising white pigmented polymeric resin coated onto an aluminum foil base and a multiplicity of the spheroids partially embedded in the polymeric resin, yield a brightness of greater than 1 mcd/ft$^2$/fc.

5. The $Al_2O_3$ spheroid of claim 1 which further comprises small amounts of an additive selected from the group consisting of MgO, $MgF_2$, $TiO_2$, $La_2O_3$ and $Y_2O_3$.

6. A pavement marking comprising a binder in which are held a multiplicity of the $Al_2O_3$ spheroids of claim 1.

7. The pavement marking of claim 6 which comprises a sheet material comprising:
   A. A base sheet selected from the group consisting of aluminum foil and polymeric sheet materials;
   B. A binder layer adhered to one surface of the base sheet; and
   C. A layer of the transparent $Al_2O_3$ spheroids at least partially embedded in the binder layer.

8. A coating composition comprising the $Al_2O_3$ spheroids of claim 1 mixed with a binder material.

9. A process for making transparent $Al_2O_3$ spheroids comprising the steps of:
   (i) making an aqueous sol of a material selected from a group consisting of aluminum isopropoxide and aluminum monohydrate;

(ii) forming droplets of the sol from step (i) and dispersing said droplets in a particle forming fluid for chemical gelation which is substantially water immiscible, stirring the forming fluid to disperse the droplets and maintaining the droplets in the forming fluid for a sufficient time for them to gell;

(iii) removing the gelled droplets from the forming fluid;

(iv) drying the wet droplets from (iii);

(v) pre-firing the dried droplets by heating gradually to a temperature of 800°–1200° C.;

(vi) firing the droplets in the following sequence:

(a) firing in dry oxygen at 1,800°–1,975° C. for 5–30 minutes followed by (b) firing in wet hydrogen at 1,800°–1,975° C. for 10–350 minutes in order to form hardened fired $Al_2O_3$ spheroids; and (vii) allowing the $Al_2O_3$ spheroids to cool.

10. The process of claim 9 wherein the majority of the colloidal particles in the sol of step (i) have a particle size of not more than 60 nm.

* * * * *

UNITED STATES PATENT AND TRADEMARK OFFICE
CERTIFICATE OF CORRECTION

PATENT NO. : 4,837,069

DATED : June 6, 1989

INVENTOR(S) : Bescup, Fellows and Leedecke

It is certified that error appears in the above-identified patent and that said Letters Patent is hereby corrected as shown below:

In the specification:

Column 3, line 14, "by means" should be -- by a means --

Column 3, line 32, "After 5-15" should be -- About 5-15 --

Column 6, line 55, "2/3" should be -- 1/4 --

Signed and Sealed this

Sixth Day of March, 1990

*Attest:*

JEFFREY M. SAMUELS

*Attesting Officer*  *Acting Commissioner of Patents and Trademarks*